United States Patent
Kim et al.

(10) Patent No.: US 11,848,158 B2
(45) Date of Patent: Dec. 19, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Min Hyang Kim, Suwon-si (KR); Hyung Duk Yun, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/469,158

(22) Filed: Sep. 8, 2021

(65) Prior Publication Data

US 2022/0130609 A1    Apr. 28, 2022

(30) Foreign Application Priority Data

Oct. 28, 2020    (KR) .................... 10-2020-0141216

(51) Int. Cl.
  *H01G 4/232*  (2006.01)
  *H01G 4/30*  (2006.01)
  *H01G 4/008*  (2006.01)
  *H01G 4/248*  (2006.01)

(52) U.S. Cl.
  CPC ........... *H01G 4/232* (2013.01); *H01G 4/0085* (2013.01); *H01G 4/248* (2013.01); *H01G 4/30* (2013.01)

(58) Field of Classification Search
  None
  See application file for complete search history.

(56) References Cited

U.S. PATENT DOCUMENTS

| | | | |
|---|---|---|---|
| 2014/0160627 A1* | 6/2014 | Kobayashi | H01G 4/2325 361/303 |
| 2016/0027583 A1* | 1/2016 | Ahn | H01G 4/12 361/301.4 |
| 2017/0098506 A1* | 4/2017 | Ando | H01G 4/228 |
| 2017/0301468 A1* | 10/2017 | Kim | H01G 4/2325 |
| 2018/0151296 A1* | 5/2018 | Yamada | H01G 2/065 |
| 2018/0268998 A1* | 9/2018 | Onodera | H01G 4/248 |
| 2019/0272955 A1* | 9/2019 | Oh | H01G 4/2325 |
| 2019/0304683 A1* | 10/2019 | Terashita | H01G 4/228 |
| 2020/0135401 A1* | 4/2020 | Shin | H01G 4/30 |
| 2022/0130609 A1* | 4/2022 | Kim | H01G 4/0085 |

FOREIGN PATENT DOCUMENTS

| | | |
|---|---|---|
| JP | 2003-197460 A | 7/2003 |
| JP | 2017-073434 A | 4/2017 |

* cited by examiner

*Primary Examiner* — Dion R. Ferguson
(74) *Attorney, Agent, or Firm* — MORGAN, LEWIS & BOCKIUS LLP

(57) ABSTRACT

A multilayer ceramic electronic component may include: a ceramic body including a dielectric layer and first and internal electrodes disposed to be stacked with the dielectric layer interposed therebetween; a first and a second external electrode disposed on the ceramic body. The first and the second external electrodes may include a first and a second base electrode layers disposed in contact with the ceramic body and a first and a second resin electrode layers disposed on the first and the second base electrode layer respectively, a width of the ceramic body in the second direction may be less than 1.0 mm, and 0.4×ta≤tb≤0.5×ta in which ta is an average thickness of the first base electrode layer and tb is an average thickness of the first resin electrode layer.

22 Claims, 2 Drawing Sheets

A

MULTILAYER CERAMIC ELECTRONIC COMPONENT

CROSS-REFERENCE TO RELATED APPLICATION

This application claims benefit of priority to Korean Patent Application No. 10-2020-0141216 filed on Oct. 28, 2020 in the Korean Intellectual Property Office, the disclosure of which is incorporated herein by reference in its entirety.

TECHNICAL FIELD

The present disclosure relates to a multilayer ceramic electronic component.

BACKGROUND

In recent years, as an application area of electronic products has expanded, a technical field in which multilayer ceramic electronic components are used has also expanded. In particular, a structure in which an electronic control unit (ECU) or a transmission control unit (TCU) of a vehicle is disposed in an engine room or directly attached to a transmission is used as vehicles are electronalized.

However, when existing multilayer ceramic electronic components are applied to a harsh environment such as high temperature and high vibration, expansion and contraction due to high/low temperature cycles are repeated to cause continuous mechanical stress. In addition, application of the continuous mechanical stress is a major cause of cracking in terminal electrodes or solder.

In order to solve this problem, a method of absorbing external impacts or internal stress by applying a soft material such as an epoxy resin to external electrodes is used. When such a soft material is applied, abase resin has a higher modulus of elasticity than that of metal, so that cracks caused by mechanical stress may be alleviated.

However, when the soft material is applied, since the base resin is an insulating material, problems such as an increase in resistance or decrease in electrode contact inevitably arise. Therefore, studies to improve electrical characteristics, while taking advantage of the soft material, have been conducted in various fields.

SUMMARY

An aspect of the present disclosure may provide a multilayer ceramic electronic component capable of preventing deterioration in electrical characteristics.

An aspect of the present disclosure may also provide a multilayer ceramic electronic component having improved equivalent series resistance (ESR) characteristics.

An aspect of the present disclosure may also provide a multilayer ceramic electronic component to which external electrodes having improved density, while suppressing an increase in resistance, are applied.

According to an aspect of the present disclosure, a multilayer ceramic electronic component may include: a ceramic body including a dielectric layer and first and internal electrodes disposed to be stacked in a third direction with the dielectric layer interposed therebetween and having first and second surfaces opposing each other in a first direction, third and fourth surfaces opposing each other in a second direction, and fifth and sixth surfaces opposing each other in the third direction; a first external electrode disposed on the first surface of the ceramic body and a second external electrode disposed on the second surface of the ceramic body. The first external electrode may include a first base electrode layer disposed in contact with the ceramic body and a first resin electrode layer disposed on the first base electrode layer, the second external electrode may include a second base electrode layer disposed in contact with the ceramic body and a second resin electrode layer disposed on the second base electrode layer, a width of the ceramic body in the second direction may be less than 1.0 mm, and $0.4 \times ta \leq tb \leq 0.5 \times ta$ in which ta is an average thickness of the first base electrode layer and tb is an average thickness of the first resin electrode layer.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
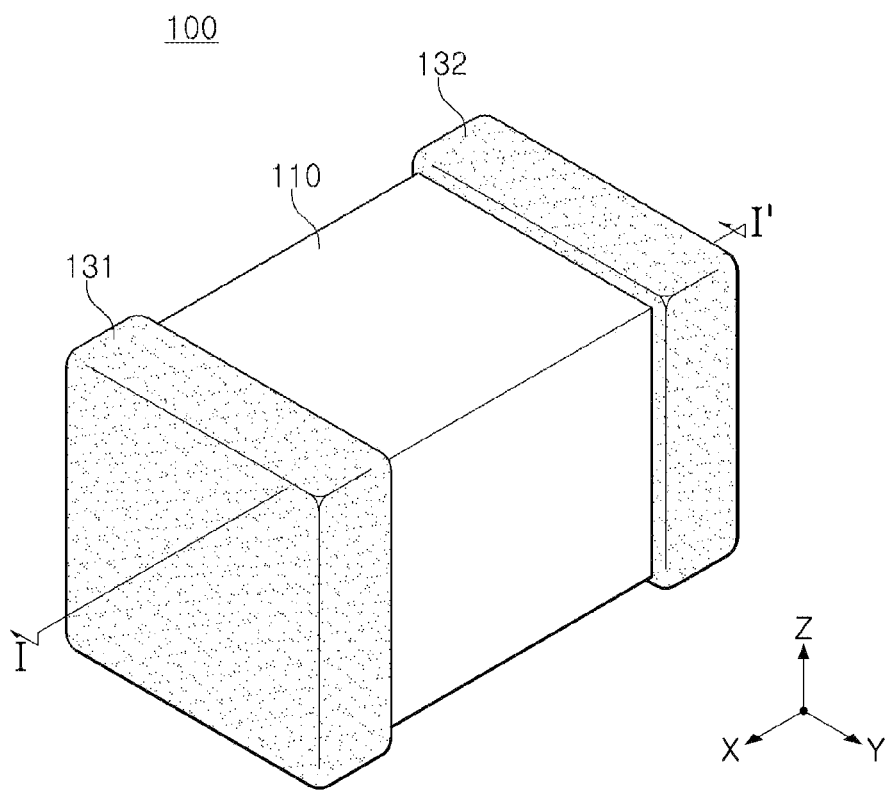
FIG. 1 is a perspective view schematically showing a multilayer ceramic electronic component according to an exemplary embodiment in the present disclosure.

Exemplary embodiments of the present disclosure will now be described in detail with reference to the accompanying drawings.

In the drawings, an X direction may be defined as a first direction, an L direction, or a length direction, a Y direction may be defined as a second direction, a W direction, or a width direction, and a Z direction may be defined as a third direction, a T direction, or a thickness direction.

Figure 2:
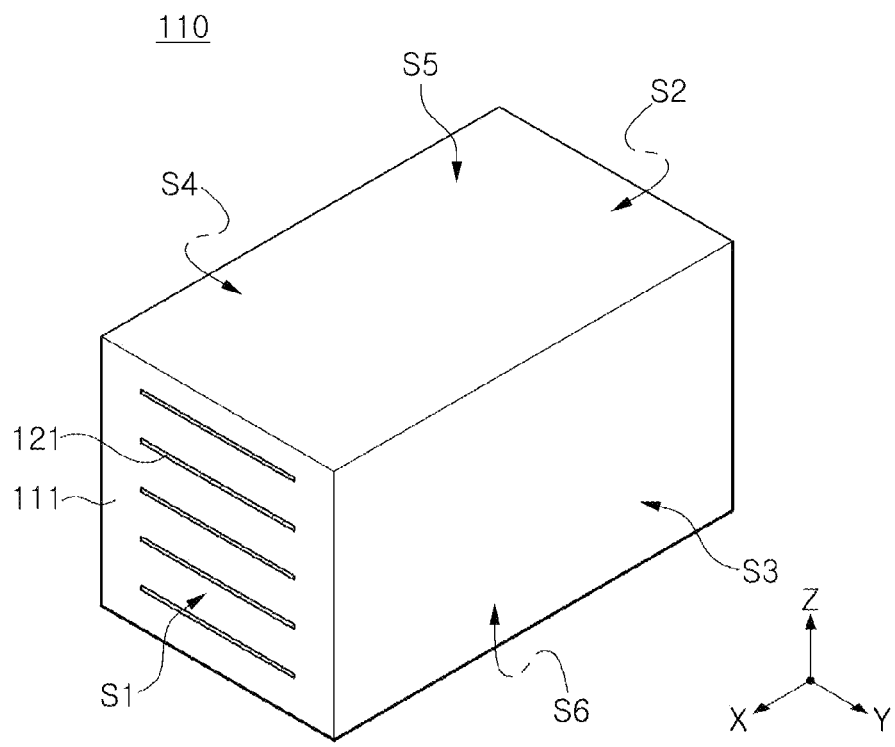
FIG. 2 is a perspective view schematically illustrating a ceramic body of a multilayer ceramic electronic component according to an exemplary embodiment in the present disclosure.
Figure 3:
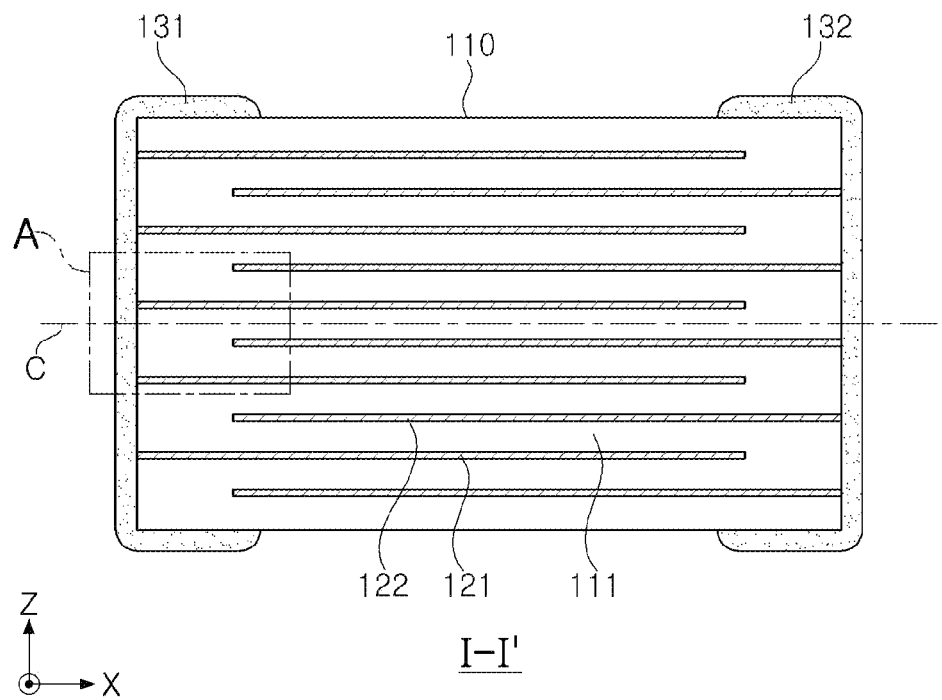
FIG. 3 is a cross-sectional view taken along line I-I' of FIG. 1.
Figure 4:
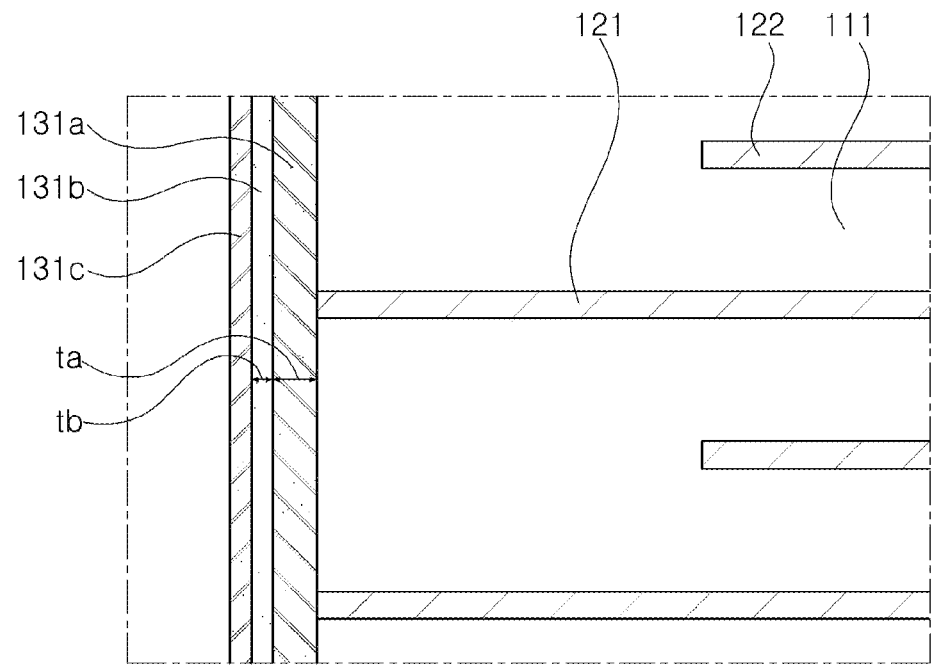
FIG. 4 is an enlarged view of region A of FIG. 3.

FIG. 1 is a perspective view schematically showing a multilayer ceramic electronic component according to an exemplary embodiment in the present disclosure, FIG. 2 is a perspective view schematically illustrating a ceramic body of a multilayer ceramic electronic component according to an exemplary embodiment in the present disclosure, FIG. 3 is a cross-sectional view taken along line I-I' of FIG. 1, and FIG. 4 is an enlarged view of region A of FIG. 3.

Referring to FIGS. 1 through 4, a multilayer ceramic electronic component according to an exemplary embodiment in the present disclosure may include: a ceramic body 110 including a dielectric layer 111 and first and internal electrodes 121 and 122 disposed to be stacked in a third direction (Z direction) with the dielectric layer 111 interposed therebetween and having first and second surfaces S1 and S2 opposing each other in a first direction (X direction), third and fourth surfaces S3 and S4 opposing each other in a second direction (Y direction), and fifth and sixth surfaces S5 and S6 opposing each other in the third direction (Z direction); a first external electrode 131 disposed on the first surface S1 of the ceramic body 110 and a second external electrode 132 disposed on the second surface S2 of the ceramic body 110. The first external electrode 131 may include a first base electrode layer disposed in contact with the ceramic body and a first resin electrode layer disposed on the first base electrode layer, and the second external electrode may include a second base electrode layer disposed in contact with the ceramic body and a second resin electrode layer disposed on the second base electrode layer.

The multilayer ceramic electronic component 100 according to an exemplary embodiment may include the ceramic body 110 including the dielectric layer 111 and the first and second internal electrodes 121 and 122 alternately stacked with the dielectric layer 111 interposed therebetween.

The ceramic body 110 of the multilayer ceramic electronic component 100 according to the present disclosure may include the dielectric layer 111 and the first and second internal electrodes 121 and 122 disposed to be stacked in the third direction (Z direction) with the dielectric layer 111 interposed therebetween.

There is no particular limitation on a specific shape of the ceramic body 110, but as shown, the ceramic body 110 may have a hexahedral shape or a similar shape. Due to the shrinkage of the ceramic powder contained in the ceramic body 110 during a sintering process, the ceramic body 110 may have a substantially hexahedral shape, although it is not a hexahedral shape having a complete straight line. If necessary, the ceramic body 110 may be rounded so that the corners are not angled. The rounding treatment may be, for example, barrel polishing, but is not limited thereto.

In the ceramic body 110, the dielectric layer 111, the first internal electrode 121, and the second internal electrode 122 may be alternately stacked. The dielectric layer 111, the first internal electrode 121, and the second internal electrode 122 may be stacked in the third direction (Z direction). The plurality of dielectric layers 111 are in a sintered state, and adjacent dielectric layers 111 may be integrated such that boundaries therebetween may not be readily apparent without using a scanning electron microscope (SEM).

According to an exemplary embodiment in the present disclosure, the dielectric layer 111 may include a component represented by $(Ba_{1-x}Ca_x)(Ti_{1-y}(Zr, Sn, Hf)_y)O_3$ (here, $0 \leq x \leq 1$ and $0 \leq y \leq 0.5$). The component may be, for example, a compound in which Ca, Zr, Sn and/or Hf is partially dissolved in $BaTiO_3$. In the above compositional formula, x may be in the range of 0 or more and 1 or less and y may be in the range of 0 or more and 0.5 or less, but is not limited thereto. For example, when x is 0, y is 0, and z is 0 in the above compositional formula, the component may be $BaTiO_3$. In addition, various ceramic additives, organic solvents, plasticizers, binders, dispersants, and the like may be added to the component according to the purpose of the present disclosure The dielectric layer 111 may be formed by adding an additive as necessary to a slurry containing the aforementioned material, applying slurry on a carrier film, and drying the slurry to prepare a plurality of ceramic sheets. The ceramic sheet may be formed by fabricating the slurry into a sheet type having a thickness of several μm by a doctor blade method, but is not limited thereto.

The ceramic body 110 may be formed by alternately stacking a ceramic green sheet in which the first internal electrode 121 is printed on the dielectric layer 111 and a ceramic green sheet in which the second internal electrode 122 is printed on the dielectric layer 111 in the third direction (Z direction). A printing method of the first and second internal electrodes may be a screen printing method or a gravure printing method, but is not limited thereto.

The first and second internal electrodes 121 and 122 may be stacked so that cross sections thereof are exposed to opposing ends of the ceramic body 110, respectively. Specifically, the first and second internal electrodes 121 and 122 may be exposed to both surfaces of the ceramic body 110 in the first direction (X direction), respectively, and in this case, the first internal electrode 121 may be exposed in a direction of the first surface S1 of the ceramic body 110 and the second internal electrode 122 may be exposed in a direction of the second surface S2 of the ceramic body 110.

The first and second internal electrodes 121 and 122 may include a conductive metal. The conductive metal may include, for example, silver (Ag), nickel (Ni), copper (Cu), tin (Sn), palladium (Pd), platinum (Pt), iron (Fe), gold (Au), silver (Ag), tungsten (W), titanium (Ti), lead (Pb) and may include one or more conductive metals of these alloys. The first and second internal electrodes 121 and 122 may be formed using a conductive paste containing the conductive metal.

The multilayer ceramic electronic component 100 according to the present disclosure may include the first external electrode 131 including a first base electrode 131a connected to the first internal electrode 121 and disposed to be in contact with the ceramic body 110 and a first resin electrode layer 131b disposed on the first base electrode 131a. Similar to the first external electrode 131, and the second external electrode 132 including a second base electrode connected to the second internal electrode 122 and disposed to be in contact with the ceramic body 110 and a second resin electrode layer disposed on the second base electrode. The first base electrode 131a may be disposed on the first surface S1 of the ceramic body 110 and the second base electrode (having a structure corresponding to the first base electrode 131a) may be disposed on the second surface S2 of the ceramic body 110.

FIG. 4 is an enlarged view of a cross-section of the first external electrode of the multilayer ceramic electronic component according to the present disclosure. FIG. 4 shows the first external electrode, but this may be applied equally to the second external electrode. Referring to FIG. 4, the first external electrode of the multilayer ceramic electronic component according to the present disclosure may include the first base electrode 131a having an average thickness of to and the first resin electrode layer 131b disposed on the first base electrode 131a and having an average thickness tb. In the present disclosure, the average thickness to of the first and second base electrode layers and the average thickness tb of the first and second resin electrode layers may refer to a length of the first and second base electrode layers disposed on the first surface S1 and the second surface S2 of the ceramic body 110 in the first direction and a length of the first and second resin electrode layers in the first direction and may refer to an average mean of values measured from certain five points on the first surface S1 and the second surface S2 of the ceramic body 110, in a cross-sectional cut of the ceramic body 110. In one example, the cross-sectional cut may be in a first direction-third direction plane (e.g., an X-Z plane) shown in FIG. 3. In one example, the cross-sectional cut may cut a central portion of the ceramic body 110 in the second direction (e.g., the Y direction). The location of the cross-sectional cut is not limited to such an example, and one of ordinary skill may select the cross-sectional cut at other locations in the ceramic body 110, if needed. In one example, an optical microscope or a scanning electron microscope (SEM) may be used in the measurement, although the present disclosure is not limited thereto. Other methods and/or tools appreciated by one of ordinary skill in the art, even if not described in the present disclosure, may also be used.

In a first exemplary embodiment in the present disclosure, when a width of the ceramic body in the second direction is less than 1.0 mm, the average thickness ta of the first and second base electrode layers and the average thickness tb of the first and second resin electrode layers may satisfy a relationship of $0.4 \times ta \leq tb \leq 0.5 \times ta$. That is, tb may be smaller than ta, and tb may have a thickness of at least 40% or more of ta. A lower limit of the width of the ceramic body in the second direction of the present exemplary embodiment is not particularly limited, but may be 0.5 mm or more. When the relationship between ta and tb is satisfied, the multilayer ceramic electronic component according to the present disclosure may have a sufficient electron conduction path and have excellent corner coverage capability. If tb is greater than ta, ESR may increase significantly as an electron path is excessively long.

In the above exemplary embodiment, the average thickness ta of the first and second base electrode layers may be within a range of 40 μm or more and 75 μm or less. The first and second base electrode layers are primarily electrically connected to the first and second internal electrodes and, at the same time, are disposed in contact with the ceramic body to serve to prevent penetration of external moisture or the like. If the average thickness ta of the first and second base electrode layers is less than 40 μm, the first and second base electrode layers do not have a sufficient thickness, resulting in a problem that density of the corners of the external electrodes disposed at the corners of the ceramic body decreases and a see-through defect may occur on a head surface of the ceramic body. In addition, in a case in which the average thickness of the first and second base electrode layers is greater than 75 μm, if the thickness of the external electrode is adjusted to satisfy the relationship between ta and tb described above, the electron path may not be sufficient, and thus ESR may increase.

In a second exemplary embodiment in the present disclosure, when the width of the ceramic body in the second direction is 1.0 mm or more and less than 1.4 mm, the average thickness ta of the first and second base electrode layers and the average thickness tb of the first and second resin electrode layers may satisfy the relationship of $0.3 \times ta \leq tb \leq 0.4 \times ta$. That is, tb may be smaller than ta, and tb may have a thickness of at least 30% or more of ta. When the relationship between ta and tb is satisfied, the multilayer ceramic electronic component according to the present disclosure may have a sufficient electron conduction path and have excellent corner coverage capability. If tb is greater than ta, ESR may increase significantly as the electron path is excessively long.

In the above exemplary embodiment, the average thickness ta of the first and second base electrode layers may be within a range of 55 μm or more and 95 μm or less. If the average thickness ta of the first and second base electrode layers is less than 55 μm, the first and second base electrode layers do not have a sufficient thickness, resulting in a problem that density of the corners of the external electrodes disposed at the corners of the ceramic body decreases and a see-through defect may occur on a head surface of the ceramic body. In addition, in a case in which the average thickness of the first and second base electrode layers is greater than 95 μm, if the thickness of the external electrode is adjusted to satisfy the relationship between ta and tb described above, the electron path may not be sufficient, and thus ESR may increase.

In a third exemplary embodiment in the present disclosure, when the width of the ceramic body in the second direction is 1.4 mm or more and less than 2.0 mm, the average thickness ta of the first and second base electrode layers and the average thickness tb of the first and second resin electrode layers may satisfy a relationship of $0.3 \times ta \leq tb \leq 0.4 \times ta$. That is, tb may be smaller than ta, and tb may have a thickness of at least 30% or more of ta. When the relationship between ta and tb is satisfied, the multilayer ceramic electronic component according to the present disclosure may have a sufficient electron conduction path and have excellent corner coverage capability. If tb is greater than ta, ESR may increase significantly as an electron path is excessively long.

In the above exemplary embodiment, the average thickness ta of the first and second base electrode layers may be within a range of 65 μm or more and 110 μm or less. If the average thickness ta of the first and second base electrode layers is less than 65 μm, the first and second base electrode layers do not have a sufficient thickness, resulting in a problem that density of the corners of the external electrodes disposed at the corners of the ceramic body decreases and a see-through defect may occur on a head surface of the ceramic body. In addition, in a case in which the average thickness of the first and second base electrode layers is greater than 110 μm, if the thickness of the external electrode is adjusted to satisfy the relationship between ta and tb described above, the electron path may not be sufficient, and thus ESR may increase.

In a fourth exemplary embodiment in the present disclosure, when the width of the ceramic body in the second direction is 2.0 mm or more, the average thickness ta of the first and second base electrode layers and the average thickness tb of the first and second resin electrode layers may satisfy a relationship of $0.25 \times ta \leq tb \leq 0.4 \times ta$. That is, tb may be smaller than ta, and tb may have a thickness of at least 25% or more of ta. An upper limit of the width of the ceramic body in the second direction of the present exemplary embodiment is not particularly limited, but may be 3.0 mm or less. When the relationship between ta and tb is satisfied, the multilayer ceramic electronic component according to the present disclosure may have a sufficient electron conduction path and have excellent corner coverage capability. If tb is greater than ta, ESR may increase significantly as an electron path is excessively long In the above exemplary embodiment, the average thickness ta of the first and second base electrode layers may be within a range of 75 μm or more and 130 μm or less. If the average thickness ta of the first and second base electrode layers is less than 75 μm, the first and second base electrode layers do not have a sufficient thickness, resulting in a problem that density of the corners of the external electrodes disposed at the corners of the ceramic body decreases and a see-through defect may occur on a head surface of the ceramic body. In addition, in a case in which the average thickness of the first and second base electrode layers is greater than 130 μm, if the thickness of the external electrode is adjusted to satisfy the relationship between ta and tb described above, the electron path may not be sufficient, and thus ESR may increase.

In an exemplary embodiment in the present disclosure, the first base electrode 131a and the second base electrode of the multilayer ceramic electronic component according to the present disclosure may be sintered electrodes including a conductive metal and glass. The conductive metal may include at least one of, for example, nickel (Ni), copper (Cu), tin (Sn), palladium (Pd), platinum (Pt), iron (Fe), gold (Au), silver (Ag), tungsten (W), titanium (Ti), lead (Pb), and alloys thereof. The glass may be a composition in which oxides are mixed. The glass may be at least one selected from the group consisting of silicon oxide, boron oxide, aluminum oxide, transition metal oxide, alkali metal oxide, and alkaline earth metal oxide but is not particularly limited thereto. The transition metal may be one or more selected from the group consisting of zinc (Zn), titanium (Ti), copper (Cu), vanadium (V), manganese (Mn), iron (Fe) and nickel (Ni), the alkali metal may be one or more selected from the group consisting of lithium (Li), sodium (Na) and potassium (K), and the alkaline earth metal may be one or more selected from the group consisting of magnesium (Mg), calcium (Ca), strontium (Sr) and barium (Ba).

As an example of a method of forming the first base electrode 131a and the second base electrode, the first base electrode 131a and the second base electrode may be formed by dipping a ceramic body into a conductive paste including a conductive metal and then sintering the ceramic body or may be formed by printing the conductive paste on a surface of the ceramic body through a screen printing method, a gravure printing method, or the like and sintering the ceramic body.

In addition, the first conductive layer and the second conductive layer may be formed by applying the conductive paste to the surface of the ceramic body or transferring a dry film obtained by drying the conductive paste onto the ceramic body and then sintering the ceramic body, but the method of forming the first conductive layer and the second conductive layer is not limited thereto. For example, in addition to the methods described above, the first conductive layer and the second conductive layer may be formed by forming the conductive paste on the ceramic body according to various methods and sintering the ceramic body.

In an exemplary embodiment in the present disclosure, the first resin electrode layer 131b and the second resin electrode layer of the multilayer ceramic electronic component 100 according to the present disclosure may include a conductivity imparting agent and a base resin. That is, the first resin electrode layer 131b and the second resin electrode layer of the present exemplary embodiment may be resin-based electrodes. The resin-based electrode has a structure in which a conductivity imparting agent is dispersed in the base resin. Since the resin-based electrode is manufactured in an environment at a lower temperature than the sintered electrode, the conductivity imparting agent may exist in the form of particles inside the base resin. In addition, when the first resin electrode layer 131b and the second resin electrode layer are disposed outside the first base electrode 131a and the second base electrode, respectively, physical stress such as external impact may be blocked.

The conductivity imparting agent may include a conductive metal and/or a conductive polymer. The conductive metal may be, for example, one or more selected from the group consisting of calcium (Ca), titanium (Ti), molybdenum (Mo), tungsten (W), iron (Fe), cobalt (Co), nickel (Ni), palladium (Pd), platinum (Pt), copper (Cu), silver (Ag), gold (Au), zinc (Zn), aluminum (Al), tin (Sn), lead (Pb), and alloys thereof, but is not limited thereto.

In addition, as a non-limiting example of the conductive polymer, the conductive polymer may include sulfur (S) and/or nitrogen (N)-containing compounds such as PT(poly(thiophene)), PEDOT(poly(ethylenedioxy)thiophene), PPS (poly(p-phenylene sulfide)), PANI(polyanilines), P3HT (poly(3-hexylthiophene-2,5-diyl)), PolyTPD(poly(4-butylphenyldiphenylamine)), PSS(poly(4-butylphenyldiphenylamine)), PVK(poly(9-vinylcarbazole)), PDBT (poly(4,4'-dimethoxy bithophene)), polyaniline, or polypyrrole, and compounds not including a hetero atom such as poly (fluorine), polyphenylene, polypyrene, polyazulene, polynaphthalene, PAC(poly(acetylene)), PPV(poly(p-phenylene vinylene), but is not limited thereto.

The first resin electrode layer 131b and the second resin electrode layer may include a conductive filler including a carbon filler such as carbon nanotubes, graphene, fullerene, or the like and/or a spherical, elliptical, flake, fibrous, or dendrite type alloy filler as necessary, but is not limited thereto.

The base resin included in the first resin electrode layer 131b and the second resin electrode layer may be, for example, a thermosetting resin. Specific examples of the thermosetting resin include s phenol resin, a urea resin, a diallylphthalate resin, a melanin resin, a guanamine resin, an unsaturated polyester resin, a polyurethane resin, an epoxy resin, an aminoalkyd resin, a melamine-urea cocondensation resin, a silicon resin, a polysiloxane resin, and the like, but are not limited thereto. In the case of using the thermosetting resin, a crosslinking agent, a curing agent such as a polymerization initiator, a polymerization accelerator, a solvent, a viscosity modifier, and the like may be further added and used as necessary.

According to an exemplary embodiment in the present disclosure, the first resin electrode layer 131b and the second resin electrode layer may be disposed to cover the first base electrode 131a and the second base electrode. In this disclosure, disposing the first resin electrode layer 131b and the second resin electrode layer to cover the first base electrode 131a and the second base electrode refers to disposing the first resin electrode layer 131b and the second resin electrode layer so that the first base electrode 131a and the second base electrode are not exposed to the outside. When the resin electrode layers are disposed to cover the base electrodes as described above, the first resin electrode layer 131b and the second resin electrode layer may block external contaminants and block external impacts from being transmitted to the inside.

A method of forming the first second resin electrode layer 131b and the second resin electrode layer is not particularly limited. For example, the first resin electrode layer 131b and the second resin electrode layer may be formed by dipping a ceramic body in a conductive paste containing a base resin and a conductivity imparting agent, printing the conductive paste on a surface of the ceramic body by screen printing or gravure printing, or by applying the conductive paste to the surface of the ceramic body or transferring a dry film formed by drying the conductive paste onto the ceramic body, and the like. That is, various methods may be used without being limited.

In an exemplary embodiment in the present disclosure, the multilayer ceramic electronic component 100 according to the present disclosure may include a first plating layer 131c disposed on the first resin electrode layer 131b and a second plating layer disposed on the second resin electrode layer. The first plating layer 131c and the second plating layer may be formed by sputtering or electric deposition, but is not limited thereto. A material for forming the first plating layer 131c and the second plating layer is not particularly limited, and may include nickel (Ni), copper (Cu), tin (Sn), palladium (Pd), platinum (Pt), gold (Au), silver (Ag), tungsten (W), titanium (Ti), or lead (Pb) alone or alloys thereof. In addition, the first plating layer 131c and the second plating layer may be formed as one layer, but may be formed by stacking two or more layers.

EXPERIMENTAL EXAMPLE

A test was conducted on exterior defects and ESR using chips (temperature characteristics X7R) having 1608 size (length×width: 1.6 mm×0.8 mm), 2012 size (length×width:

2.0 mm×1.2 mm), 3216 size (length×width: 3.2 mm×1.6 mm), 3225 size (length×width: 3.2 mm×2.5 mm) in which external electrodes are formed on a surface of the ceramic body in the length direction mass-produced by Samsung Electro-Mechanics.

TABLE 1

| Chip size | Thickness of external electrode | | | ESR (mΩ) |
|---|---|---|---|---|
| | ta (um) | tb (um) | (tb/ta)*100 | |
| 1608 | 40 | 35 | 88% | 127 |
| | 40 | 20 | 50% | 78 |
| | 75 | 65 | 87% | 132 |
| | 75 | 35 | 47% | 90 |
| 2012 | 55 | 45 | 82% | 76 |
| | 55 | 20 | 36% | 27.2 |
| | 95 | 70 | 74% | 62 |
| | 95 | 40 | 42% | 30.9 |
| 3216 | 65 | 50 | 77% | 88 |
| | 65 | 25 | 38% | 42 |
| | 110 | 80 | 73% | 103 |
| | 110 | 45 | 41% | 60 |
| 3225 | 75 | 50 | 67% | 78 |
| | 75 | 30 | 40% | 35 |
| | 130 | 90 | 69% | 116 |
| | 130 | 50 | 38% | 32 |

Referring to Table 1, it can be seen that, when the 1608 size chip has the same ta (40 μm), the ESR is significantly increased when tb is 0.88 times ta compared to the case in which tb is 0.5 times ta. Also, it can be seen that, even when tb is equally 35 μm, the ESR rises rapidly when tb is 0.88 times ta compared to 0.47 times ta.

In addition, it can be seen that, when the 2012 size chip has the same ta (55 μm), the ESR is significantly increased when tb is 0.82 times ta compared to the case in which tb is 0.36 times ta, and it can be seen that, even if tb is similar as 40 μm and 45 μm, the ESR rises rapidly when tb is 0.82 times ta compared to 0.42 times ta.

It can be seen that, when the 3216 size chip has the same ta (65 μm), the ESR is significantly increased when tb is 0.77 times ta compared to the case in which tb is 0.38 times ta. Also, it can be seen that, even if tb is similar as 45 μm and 50 μm, the ESR rises rapidly when tb is 0.77 times ta compared to the case in which tb is 0.41 times ta.

It can be seen that, when the 3225 chip size has the same ta (75 μm), the ESR is significantly increased when tb is 0.67 times ta compared to the case in which tb is 0.4 times ta, and it can be seen that, even if tb is equally 50 μm, the ESR rises rapidly when tb is 0.67 times ta compared to the case in which tb is 0.38 times ta.

Accordingly, it can be seen that the ESR of the multilayer ceramic electronic component is affected by the values of ta and tb as well as their ratio.

As set forth above, according to exemplary embodiments of the present disclosure, the multilayer ceramic electronic component capable of preventing deterioration in electrical characteristics may be provided.

According to exemplary embodiments of the present disclosure, the multilayer ceramic electronic component with improved ESR characteristics may be provided.

According to exemplary embodiments of the present disclosure, the multilayer ceramic electronic component to which external electrodes having improved density, while suppressing an increase in resistance, are applied may be provided.

While exemplary embodiments have been shown and described above, it will be apparent to those skilled in the art that modifications and variations could be made without departing from the scope of the present disclosure as defined by the appended claims.

What is claimed is:

1. A multilayer ceramic electronic component comprising:
a ceramic body including a dielectric layer and first and second internal electrodes disposed to be stacked in a third direction with the dielectric layer interposed therebetween and having first and second surfaces opposing each other in a first direction, third and fourth surfaces opposing each other in a second direction, and fifth and sixth surfaces opposing each other in the third direction; and
a first external electrode disposed on the first surface of the ceramic body and a second external electrode disposed on the second surface of the ceramic body,
wherein the first external electrode includes a first base electrode layer disposed in contact with the ceramic body and a first resin electrode layer disposed on the first base electrode layer,
the second external electrode includes a second base electrode layer disposed in contact with the ceramic body and a second resin electrode layer disposed on the second base electrode layer,
ratio of tb/ta is varied inversely relative to a width, w, of the ceramic body in the second direction, wherein ta is an average thickness of the first base electrode layer, tb is an average thickness of the first resin electrode layer, w is less than 1.0 mm, and $0.4 \times ta \leq tb \leq 0.5 \times ta$.

2. The multilayer ceramic electronic component of claim 1, wherein the average thickness ta of the first base electrode layers is 40 μm or more and 75 μm or less.

3. The multilayer ceramic electronic component of claim 1, wherein the first and second base electrode layers are sintered electrodes including a first conductive metal and glass.

4. The multilayer ceramic electronic component of claim 1, wherein the first and second resin electrode layers include a conductivity imparting agent and a base resin.

5. The multilayer ceramic electronic component of claim 1, further comprising a plating layer disposed on the first and second resin electrode layers.

6. A multilayer ceramic electronic component comprising:
a ceramic body including a dielectric layer and first and second internal electrodes disposed to be stacked in a third direction with the dielectric layer interposed therebetween and having first and second surfaces opposing each other in a first direction, third and fourth surfaces opposing each other in a second direction, and fifth and sixth surfaces opposing each other in the third direction; and
a first external electrode disposed on the first surface of the ceramic body and a second external electrode disposed on the second surface of the ceramic body,
wherein the first external electrode includes a first base electrode layer disposed in contact with the ceramic body and a first resin electrode layer disposed on the first base electrode layer,
the second external electrode includes a second base electrode layer disposed in contact with the ceramic body and a second resin electrode layer disposed on the second base electrode layer,
ratio of tb/ta is varied inversely relative to a width, w, of the ceramic body in the second direction, wherein ta is an average thickness of the first base electrode layer, tb is an average thickness of the first resin electrode layer, w is 1.0 mm or more and less than 2.0 mm, and 0.3×ta≤tb≤0.4×ta.

7. The multilayer ceramic electronic component of claim 6, where the width of the ceramic body in the second direction is 1.0 mm or more and less than 1.4 mm.

8. The multilayer ceramic electronic component of claim 7, wherein the average thickness to of the first base electrode layers is 55 μm or more and 95 μm or less.

9. The multilayer ceramic electronic component of claim 6, wherein the width of the ceramic body in the second direction is 1.4 mm or more and less than 2.0 mm.

10. The multilayer ceramic electronic component of claim 9, wherein the average thickness of the first and second base electrode layers is 65 μm or more and 110 μm or less.

11. The multilayer ceramic electronic component of claim 6, wherein the first and second base electrode layers are sintered electrodes including a first conductive metal and glass.

12. The multilayer ceramic electronic component of claim 6, wherein the first and second resin electrode layers include a conductivity imparting agent and a base resin.

13. The multilayer ceramic electronic component of claim 6, further comprising a plating layer disposed on the first and second resin electrode layers.

14. A multilayer ceramic electronic component comprising:
a ceramic body including a dielectric layer and first and second internal electrodes disposed to be stacked in a third direction with the dielectric layer interposed therebetween and having first and second surfaces opposing each other in a first direction, third and fourth surfaces opposing each other in a second direction, and fifth and sixth surfaces opposing each other in the third direction; and
a first external electrode disposed on the first surface of the ceramic body and a second external electrode disposed on the second surface of the ceramic body,
wherein the first external electrode includes a first base electrode layer disposed in contact with the ceramic body and a first resin electrode layer disposed on the first base electrode layer,
the second external electrode includes a second base electrode layer disposed in contact with the ceramic body and a second resin electrode layer disposed on the second base electrode layer,
ratio of tb/ta is varied inversely relative to a width, w, of the ceramic body in the second direction, wherein ta is an average thickness of the first base electrode layer, tb is an average thickness of the first resin electrode layer, w is 2.0 mm or more, and 0.25×ta≤tb≤0.4×ta, and
the first and second resin electrode layers include a carbon filler.

15. The multilayer ceramic electronic component of claim 14, wherein the average thickness ta of the first and second base electrode layers is 75 μm or more and 130 μm or less.

16. The multilayer ceramic electronic component of claim 14, wherein the first and second base electrode layers are sintered electrodes including a first conductive metal and glass.

17. The multilayer ceramic electronic component of claim 14, wherein the first and second resin electrode layers include a conductivity imparting agent and a base resin.

18. The multilayer ceramic electronic component of claim 14, further comprising a plating layer disposed on the first and second resin electrode layers.

19. The multilayer ceramic electronic component of claim 14, wherein the carbon filler includes a carbon nanotube, graphene, or fullerene.

20. The multilayer ceramic electronic component of claim 14, wherein the first and second resin electrode layers further include a conductive filler comprising a spherical, elliptical, flake, fibrous, or dendrite type alloy filler.

21. A multilayer ceramic electronic component comprising:
a ceramic body including a dielectric layer and first and second internal electrodes disposed to be stacked in a third direction with the dielectric layer interposed therebetween and having first and second surfaces opposing each other in a first direction, third and fourth surfaces opposing each other in a second direction, and fifth and sixth surfaces opposing each other in the third direction; and
a first external electrode disposed on the first surface of the ceramic body and a second external electrode disposed on the second surface of the ceramic body,
wherein the first external electrode includes a first base electrode layer disposed in contact with the ceramic body and a first resin electrode layer disposed on the first base electrode layer,
the second external electrode includes a second base electrode layer disposed in contact with the ceramic body and a second resin electrode layer disposed on the second base electrode layer,
ratio of tb/ta is varied inversely relative to a width, w, of the ceramic body in the second direction, wherein to is an average thickness of the first base electrode layer, tb is an average thickness of the first resin electrode layer.

22. The multilayer ceramic component of claim 21, wherein tb/ta is in a range from 0.4 to 0.5 when w is less than 1.0 mm, tb/ta is in a range from 0.3 to 0.4 when w is in a range from 1.0 mm to 2.0 mm, and tb/ta is in a range from 0.25 to 0.4 when w is greater than or equal to 2.0 mm.

* * * * *